N. A. PALMGREN.
COMBINED RADIAL AND THRUST BALL BEARING.
APPLICATION FILED JUNE 26, 1919.

1,346,417. Patented July 13, 1920.

INVENTOR :
Nils Arvid Palmgren
By Attorneys,

UNITED STATES PATENT OFFICE.

NILS ARVID PALMGREN, OF GOTTENBORG, SWEDEN, ASSIGNOR TO S K F ADMINISTRATIVE COMPANY, INC., OF NEW YORK, N. Y.

COMBINED RADIAL AND THRUST BALL-BEARING.

1,346,417.          Specification of Letters Patent.     Patented July 13, 1920.

Application filed June 26, 1919.  Serial No. 306,918.

*To all whom it may concern:*

Be it known that I, NILS ARVID PALMGREN, a subject of the King of Sweden, residing at Gottenborg, in the Kingdom of Sweden, have invented a new and useful Improvement in Combined Radial and Thrust Ball-Bearings, of which the following is a specification.

The present invention relates to an improvement in combined radial and thrust ball bearings of the type which consist of at least one thrust ball bearing and at least one radial ball bearing which bearings are mounted in a common casing.

The present improvement has for its purpose to make the combined bearing capable of receiving axial shocks without the thrust bearing becoming overloaded. For this purpose the invention is principally characterized by this that the radial bearing has one of its tracks cylindrical so that one of its races together with the balls may be moved axially relatively to the other race, and that elastic rings or the like are provided between the thrust ball bearing and the radial ball bearing.

Figure 1:
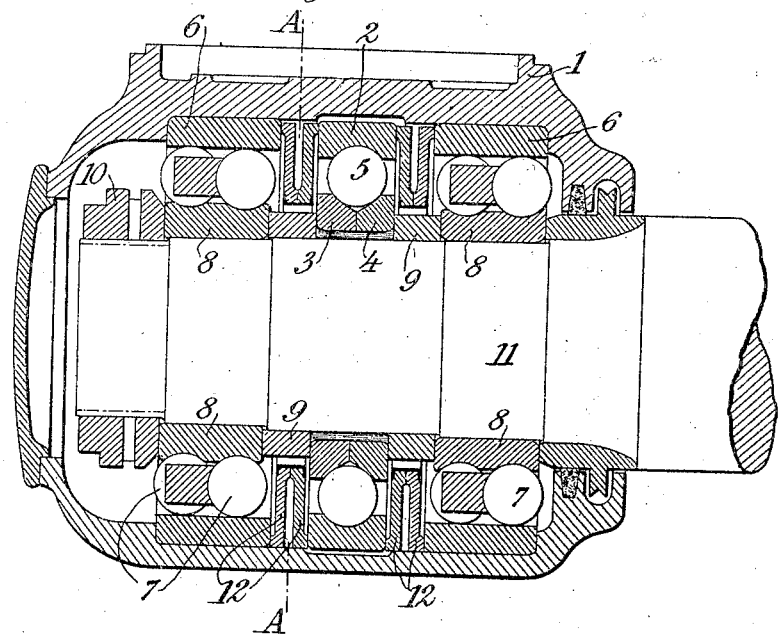
Figure 2:
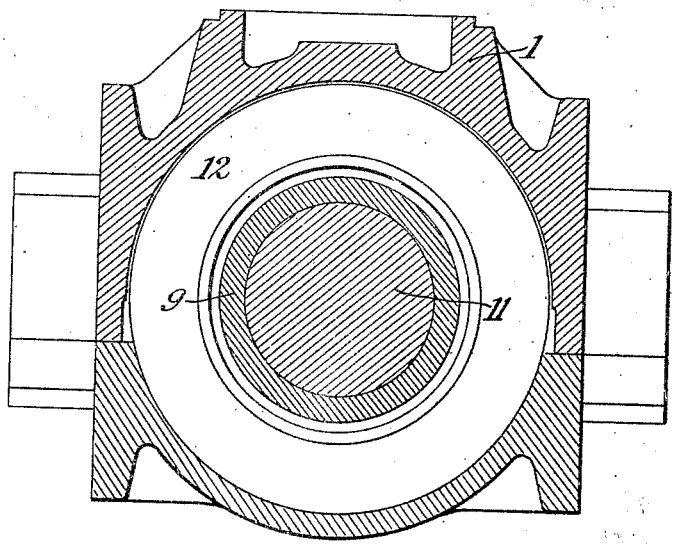

An embodiment of the invention is shown in the accompanying drawing by way of example. Figure 1 shows an axial section of a combined radial and thrust ball bearing according to the present invention, and Fig. 2 shows a cross section on the line II—II in Fig. 1.

The combination bearing illustrated in the drawing comprises a central thrust ball bearing and two radial ball bearings located on either side of said thrust bearing, all bearings being mounted in a common casing 1 illustrated in the drawing as a journal box, for instance for a railway carriage. The thrust ball bearing is illustrated as a grooved ball bearing having a solid outer race 2 and an inner race divided into two halves 3 and 4 on a plane perpendicular to the axis of the bearing. The tracks of the races have a radius of curvature practically equal to that of the balls 5, so that the bearing is capable of receiving comparatively great axial forces. The radial ball bearings have solid outer races 6 with cylindrical outer tracks for the balls 7, the inner races 8, which are also solid, being provided with shallow grooved tracks for the balls. On account of the cylindrical outer tracks the outer races 6 may move in axial direction relatively to the inner tracks and to the balls, and these bearings are thus only capable of receiving radial forces, and their function is not interfered with by axial dislocations resulting from axial forces.

Collars 9 are provided between the inner races 3, 4 and 8, 8 which collars retain said races at definite distances from one another. Said races are secured to the shaft 11 by means of a nut 10 in such manner that they are not capable of sliding on the shaft. Elastic rings or flanges 12 are provided between the outer races 2 and 6, 6, said rings permitting a certain mutual movement of the races in axial direction. Two such rings 12 are placed between each pair of adjacent races 2 and 6, said rings having together an approximately U-shaped cross section, as illustrated in Fig. 1. The outer side faces of the races 6 bear against corresponding abutments in the casing 1.

If the combination bearing above described is subjected to an axial shock, said shock will be received by the central thrust bearing, but the shock will be lessened by the elastic rings 12, so that the thrust bearing does not become overloaded.

The embodiment illustrated may of course be modified in several respects without departing from the principle of the invention as expressed in the claims. Instead of the outer races 6, for instance, the inner races 8 of the radial bearings may of course be provided with cylindrical tracks.

I claim:

1. In a combined radial and thrust bearing, the combination of a casing, at least one thrust ball bearing in said casing, at least one radial ball bearing in said casing, said radial ball bearing having one track cylindrical so as to enable one of its races to move axially relatively to the other race, and elastic means between said thrust ball bearing and said radial ball bearing.

2. In a combined radial and thrust bearing, the combination of a casing, a thrust ball bearing in said casing, radial ball bearings on either side of said thrust ball bearing in said casing, said radial ball bearings each having one track cylindrical so as to enable one of its races to move axially relatively to the other race, and elastic rings on either side of said thrust ball bearing between said bearing and said radial ball bearings.

3. In a combined radial and thrust bearing, the combination of a casing, a ring thrust ball bearing in said casing having tracks in both races and having the inner track divided on a plane perpendicular to the axis of the bearing, radial ball bearings on either side of said thrust ball bearing in said casing, said radial ball bearings each having one track cylindrical so as to enable one of its races to move axially relatively to the other race, and elastic rings on either side of said thrust ball bearing between said bearing and said radial ball bearings.

NILS ARVID PALMGREN.